(12) United States Patent
Sagawa

(10) Patent No.: US 8,265,429 B2
(45) Date of Patent: Sep. 11, 2012

(54) IMAGE PROCESSING APPARATUS AND METHODS FOR LAYING OUT IMAGES

(75) Inventor: Naotsugu Sagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 12/277,462

(22) Filed: Nov. 25, 2008

(65) Prior Publication Data

US 2009/0169132 A1 Jul. 2, 2009

(30) Foreign Application Priority Data

Dec. 28, 2007 (JP) ................................ 2007-341118

(51) Int. Cl.
*G06K 9/54* (2006.01)
*G06F 17/00* (2006.01)
(52) U.S. Cl. ........................................ 382/305; 715/243
(58) Field of Classification Search .................. 382/305; 715/243
See application file for complete search history.

(56) References Cited

U.S. PATENT DOCUMENTS

| | | | |
|---|---|---|---|
| 5,926,562 A | 7/1999 | Hyodo et al. | |
| 6,324,545 B1 * | 11/2001 | Morag | 707/737 |
| 6,571,248 B1 | 5/2003 | Kusama | |
| 6,952,503 B2 | 10/2005 | Matsuura | |
| 7,542,596 B2 * | 6/2009 | Bacus et al. | 382/128 |
| 7,773,832 B2 * | 8/2010 | Nakajima | 382/305 |
| 2001/0035875 A1 * | 11/2001 | Suzuki et al. | 345/723 |
| 2002/0040375 A1 * | 4/2002 | Simon et al. | 707/517 |
| 2003/0128389 A1 * | 7/2003 | Matraszek et al. | 358/1.18 |
| 2004/0183915 A1 * | 9/2004 | Gotohda et al. | 348/207.11 |
| 2004/0187078 A1 * | 9/2004 | Girgensohn | 715/517 |
| 2005/0071783 A1 * | 3/2005 | Atkins | 715/851 |
| 2006/0103891 A1 * | 5/2006 | Atkins | 358/450 |
| 2006/0200758 A1 * | 9/2006 | Atkins | 715/517 |
| 2006/0279566 A1 * | 12/2006 | Atkins et al. | 345/418 |
| 2008/0065499 A1 * | 3/2008 | Golub et al. | 705/26 |

FOREIGN PATENT DOCUMENTS

| | | |
|---|---|---|
| JP | 9-068764 A | 3/1997 |
| JP | 11-317873 A | 11/1999 |
| JP | 2001-043118 A | 2/2001 |
| JP | 2007-306264 A | 11/2007 |

OTHER PUBLICATIONS

Japanese Office Action for Appln. No. 2007-341118 dated Nov. 18, 2011.

* cited by examiner

*Primary Examiner* — Wenpeng Chen

(74) *Attorney, Agent, or Firm* — Carter, DeLuca, Farrell & Schmidt LLP

(57) ABSTRACT

An image processing apparatus, includes an input unit that inputs a plurality of input images. The image processing apparatus also includes an acquisition unit that acquires photographic information added to each of the plurality of input images. The image processing apparatus further includes a first setting unit that sets control information used to control a layout of each of the plurality of input images in accordance with whether or not the photographic information indicates that the respective input image is photographed with emphasis on an object. The image processing apparatus further includes a generator that generates an output image on which each of the plurality of input images is configured to have an image size according to the control information of the respective input image.

8 Claims, 13 Drawing Sheets

| ANALYSIS RESULT OF PHOTOGRAPHIC INFORMATION | SCP |
|---|---|
| IMAGE WITHOUT EMPHASIS ON OBJECT | 0 |
| MACRO PHOTOGRAPHIC IMAGE | 1 |
| SCENIC IMAGE | 2 |
| IMAGE WITH SHALLOW DEPTH OF FIELD | 3 |

IMAGE PROCESSING APPARATUS AND METHODS FOR LAYING OUT IMAGES

BACKGROUND OF THE INVENTION

1. Field of the Invention

The present invention relates to image processing for generating an output image on which a plurality of images are laid out.

2. Description of the Related Art

Upon creating a digital photo album, images are input to a template having a plurality of frames, and pictures with different sizes are laid out. As a result, an album having liveliness and good appearance can be created compared to a case in which all pictures are laid out to have the same size. Typically, picture images are automatically assigned to frames of a template based on their file names and photographing dates and times. For this reason, a certain picture that an album creator wants to lay out in a large size may be laid out in a small size, resulting in an album without liveliness.

As a technique for solving a problem associated with image sizes upon laying out pictures (to be referred to as layout sizes hereinafter), a technique that allows an album creator to manually adjust the layout sizes is known. Also, a technique that automatically determines the layout sizes based on priority manually set by an album creator is known. However, these techniques require an album creator to make troublesome operations.

SUMMARY OF THE INVENTION

According to an aspect of the present invention, a method of controlling an image processing apparatus, the method includes inputting a plurality of images; acquiring additional information added to each of the plurality of images; setting control information used to control a layout of the plurality of images in accordance with the additional information; and generating an output image on which each of the plurality of images is configured to have an image size according to the control information of the respective image.

According to another aspect of the present invention, an album image on which a plurality of images are respectively laid out in preferred image sizes without requiring an album creator to make any troublesome operations.

Further features and aspects of the present invention will become apparent from the following description of exemplary embodiments with reference to the attached drawings.

DESCRIPTION OF THE EMBODIMENTS

Various embodiments of the present invention will be described in detail hereinafter with reference to the accompanying drawings. Note that these embodiments will explain a case in which an album image is generated as an output image.

A first embodiment will explain a method of determining a scale-up magnification of the size of each assignment destination frame of a given image according to information added to the image to be laid out upon laying out images on a template on which all frames are arranged to have a standard size.

[Arrangement of Apparatus]

Figure 1:
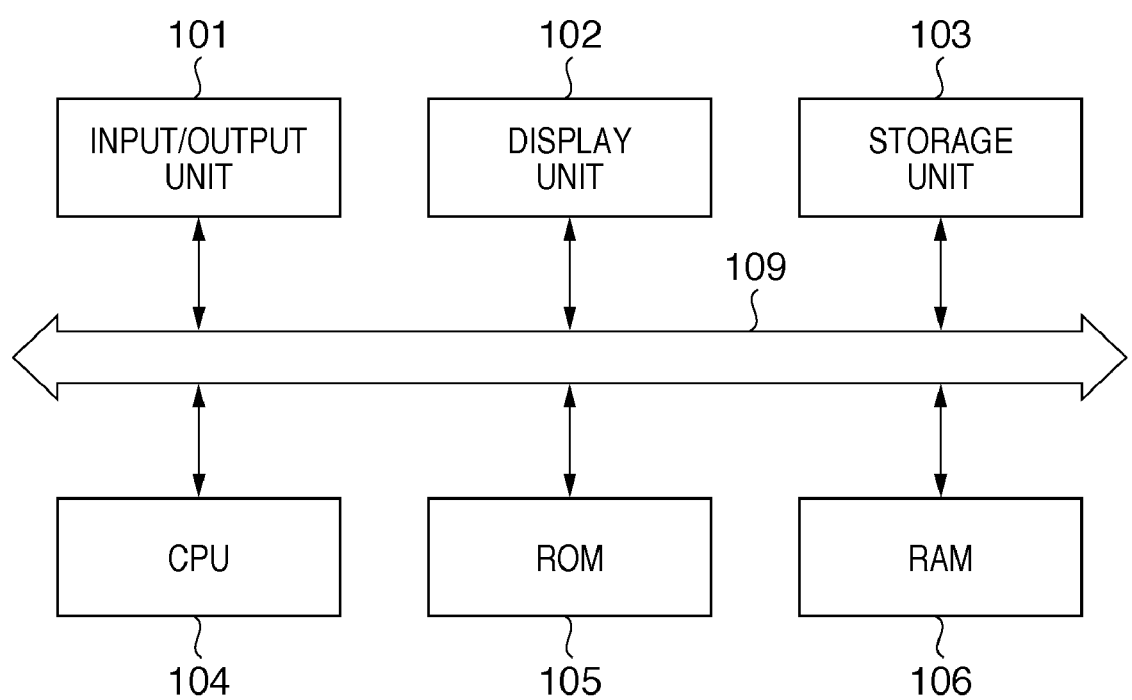
FIG. 1 is a block diagram showing the arrangement of an image processing apparatus according to an embodiment.

FIG. 1 is a block diagram showing the arrangement of an image processing apparatus of this embodiment.

A microprocessor (CPU) 104 controls components to be described below via a system bus 109 by executing various programs stored in a read-only memory (ROM) 105 and storage unit 103 using a random access memory (RAM) 106 as a work memory. The CPU 104 executes various processes including those to be described below.

An input/output unit 101 comprises a serial bus interface such as USB (Universal Serial Bus), IEEE1394, or the like, which connects input devices such as a keyboard, mouse, and the like, and image input and output devices such as a memory card reader/writer, digital camera, printer, and the like. The input/output unit 101 also comprises a network interface card (NIC) used to connect to a network.

The CPU 104 inputs user's instructions from the input devices, and various data such as image data and the like from a memory card, image input device, and a server on the network via the input/output unit 101. The CPU 104 outputs image data of a layout result (data of an output image) to the image output device or to the memory card or server via the input/output unit 101.

A display unit 102 includes, for example, a liquid crystal panel (LCD). The CPU 104 displays a graphical user interface (GUI) and the like on the display unit 102. The storage unit 103 includes, for example, a hard disk drive (HDD), which stores an operating system (OS), various programs such as programs for processes to be described later and the like, and various data such as templates, images, and the like.

[Layout Processing]

Figure 2:
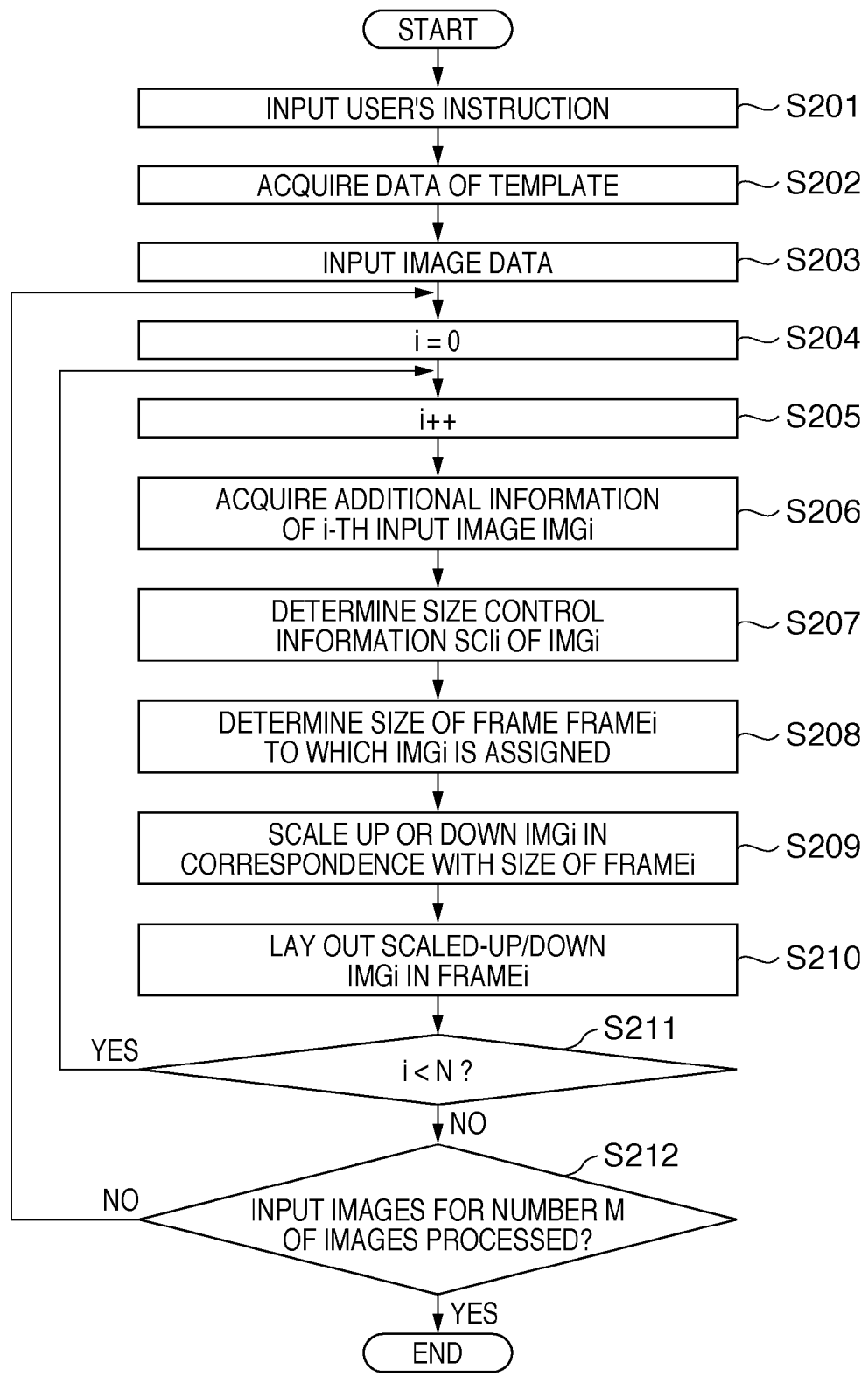
FIG. 2 is a flowchart showing an example of layout processing.

FIG. 2 is a flowchart showing an example of layout processing. The CPU 104 executes this processing.

The CPU 104 inputs a user's instruction associated with a template and a plurality of images (N images) to be laid out using the template via the input/output unit 101 (S201). Then, the CPU 104 acquires data of the template designated by the user from the storage unit 103 (S202), and inputs a plurality of image data designated by the user (S203). When the number M of images exceeds the number N of frames of the template, the CPU 104 inputs image data for the number N of frames.

Figure 3:
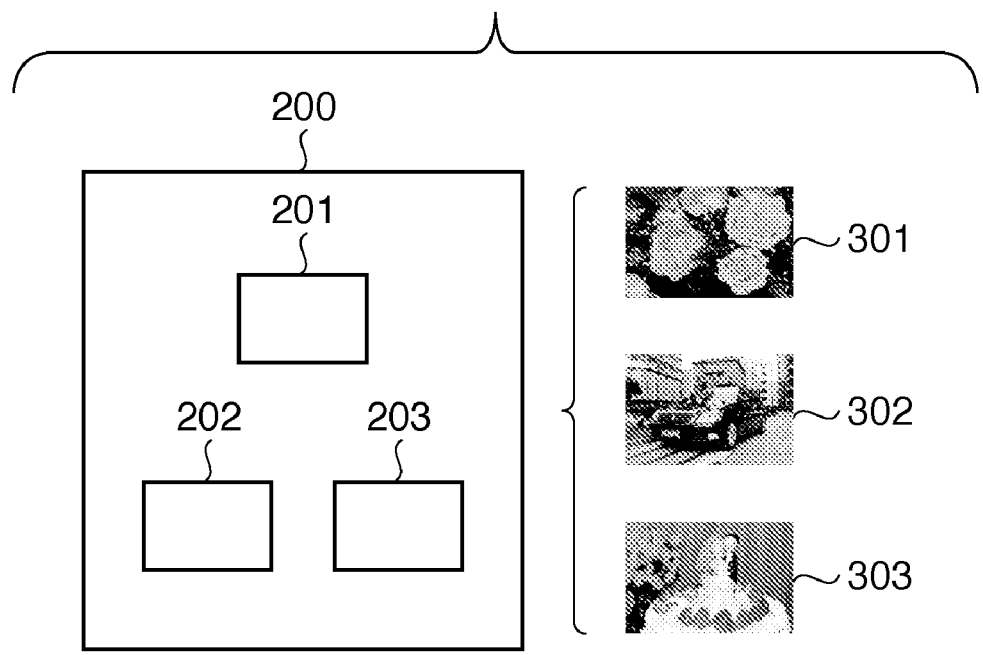
FIG. 3 is a view for explaining the relationship between a template and images.

FIG. 3 is a view for explaining the relationship between the template and images. Assume that a template 200 has three frames 201, 202, and 203 having the same size (standard size), and three images 301, 302, and 303 having the same size are to be laid out. Note that each frame indicates an image layout position and image layout size. Also, the image 301 is a macro photographic image, the image 302 is an image photographed using a standard lens, and the image 303 is an image photographed in a full aperture using a telephoto lens. Assume that the frames to which the images are assigned are determined in advance, and the image 301 is assigned to the frame 201, the image 302 is assigned to the frame 202, and the image 303 is assigned to the frame 203.

The CPU 104 resets a counter i to zero (S204), increments the counter i (S205), and acquires information (additional information) added to the i-th input image (S206). As will be described in detail later, an example in which photographic information of each image is acquired as additional information will be explained below.

The CPU 104 determines size control information SCIi of the i-th input image (to be referred to as IMGi hereinafter) based on the acquired additional information (S207). An example in which a ratio of scaling up a frame to which an input image is assigned (a magnification with respect to the standard size) is used as size control information SCI will be described below.

To name one of images that an album creator wants to lay out in a large size, there is an image photographed by a photographer with emphasis on an object by design. An image photographed with emphasis on an object includes, for example, the following three types.

- a close-up image of an object (to be referred to as a macro photographic image hereinafter)
- an image photographed by adjusting a focus on an object as a whole using a wide-angle lens (to be referred to as a scenic image hereinafter)
- an image photographed by capturing an image of an object in a full aperture using a telephoto lens (an image in which an object is in focus, and the background is blurred; to be referred to as an image with a shallow depth of field hereinafter)

Hence, when an image of interest is estimated as an image photographed by a photographer with emphasis on an object by design, the CPU 104 sets a layout size (e.g., SCI=1.5) larger than the standard size; otherwise, it sets the same layout size (SCI=1.0) as the standard size.

The CPU 104 determines the size of a frame to which the IMGi is to be assigned (to be referred to as FRAMEi hereinafter), based on the determined size control information SCIi of the IMGi (S208). The size of the FRAMEi is set to be a size by scaling up or down the length and width of the standard size based on the SCIi.

When all the frames are simply scaled up, images may overlap each other, or may lie off the template. Hence, a maximum magnification thExmax at which images do not overlap (to allow a slight overlap) and do not lie off the template is set in each frame. When the SCI exceeds the maximum magnification thExmax (SCI>thExmax), the SCI is limited (e.g., SCI=thExmax).

The CPU 104 scales up or down the IMGi in correspondence with the determined size of the FRAMEi (S209), and lays out the scaled-up/down IMGi in the FRAMEi (S210). Note that the image is scaled up or down while maintaining the proportions of the input image. Therefore, the image does not lie off exceeding the size of the FRAMEi.

The CPU 104 compares the counter i and the number N of frames (S211). If i<N, the process returns to step S205 to process the next input image. If i=N, the processing for one album image is complete. Hence, the CPU 104 checks if processing of input images of the number M of images is completed (S212). If images to be processed still remain, the process returns to step S204, and the CPU 104 repeats steps S204 to S210 until the processing for input images of the number M of images is complete.

Figure 4:
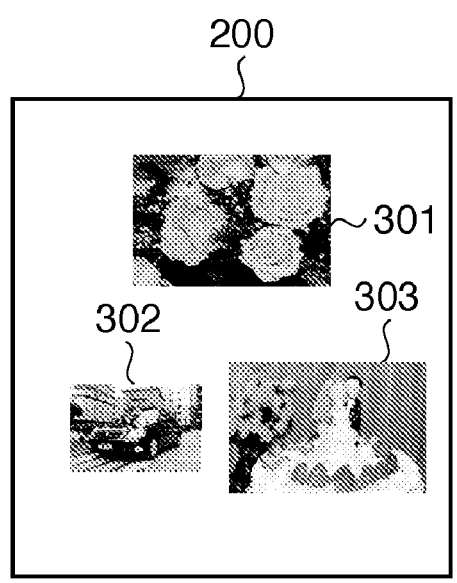
FIG. 4 is a view showing an example of a layout result.

FIG. 4 shows an example of the layout result. The macro photographic image 301 and the image 303 which was photographed in a full aperture using the telephoto lens are laid out in layout sizes larger than the standard size, and the image 302 photographed using the standard lens is laid out in the standard size.

Acquisition of Additional Information

A method of acquiring, as additional information, the focal length, f-number, f-stop number, object distance, and photographic mode will be described below.

Figure 5:
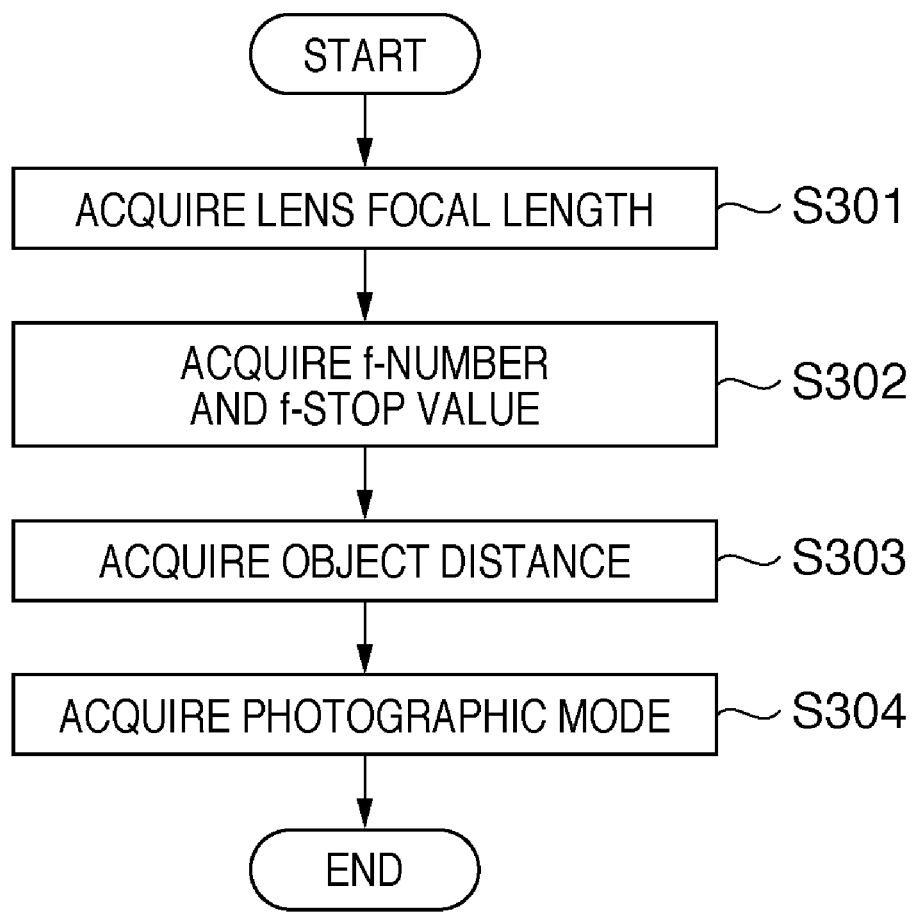
FIG. 5 is a flowchart for explaining acquisition of additional information.

FIG. 5 is a flowchart for explaining the acquisition (S206) of additional information.

The CPU 104 acquires a focal length Lfli of a lens used upon photographing from the IMGi (S301).

A commercially available digital camera normally records a data file of a photographic image in a storage medium using an Exif format as an image file standard. According to the Exif format, various metadata associated with a photographic image can be recorded in an image data file in a tag format.

The metadata can include photographic information such as an exposure time, shutter speed, and the like in addition to basic image information such as the width, height, and the like of an image, the model name of the camera, GPS information, and the like. The photographic information also includes the focal length of a lens. Hence, by analyzing the tag structure recorded in an image data file, metadata of a tag (tag ID=37386) that records the focal length of the lens is acquired. When a 35 mm equivalent focal length is to be used, the following values are also acquired: the resolution of the width of a focal plane (for example, the number of horizontal effective pixels of a CCD, tag ID=41486); the resolution of the height of the focal plane (for example, the number of vertical effective pixels of the CCD, tag ID=41487); and a unit of focus resolution (for example, a pixel, tag ID=41488). Alternatively, the value of a 35 mm equivalent focal length (tag ID=41989) may be used.

The CPU 104 acquires an f-number Fi and f-stop number Api of the lens used upon photographing from the IMGi (S302). The CPU 104 also acquires these values from the Exif metadata (f-number: tag ID=33437, f-stop number: tag ID=37378), as described above.

The CPU 104 acquires an object distance SDi upon photographing from the IMGi (S303). The CPU 104 also acquires this value from the Exif metadata (object distance: tag ID=37382), as described above. Alternatively, the value of an object distance range (tag ID=41996) may be used. Note that the value "1" of the object distance range indicates "macro"; "2", "close-range view"; and "3", "distant view".

The CPU 104 acquires a photographic mode SMi upon photographing from the IMGi (S304). The CPU 104 also acquires this value from the Exif metadata (photographic scene type: tag ID=41990), as described above. Note that the value "0" of the photographic scene type indicates a standard mode; "1", a landscape mode; "2", a portrait mode; and "3", a night scene mode.

Note that the tags indicating the aforementioned object distance, object distance range, f-number, f-stop number, lens focal length, 35 mm equivalent lens focal length, photographic scene type, resolutions of the width and height of the focal plane, and unit of the resolution of the focal plane are not indispensable tags. Therefore, some or all of these tags may not be recorded. Since the tags indicating the 35 mm equivalent lens focal length, photographic scene type, and object distance range are those added in Exif version 2.2, they are not recorded in an Exif image of the previous version. Of course, information unique to each vendor can be recorded as a manufacturer note tag in the Exif standard. If the aforementioned tags are not found or even if they are found, information recorded in the manufacturer note tag may be used.

Determination of Size Control Information SCI

Figure 6:
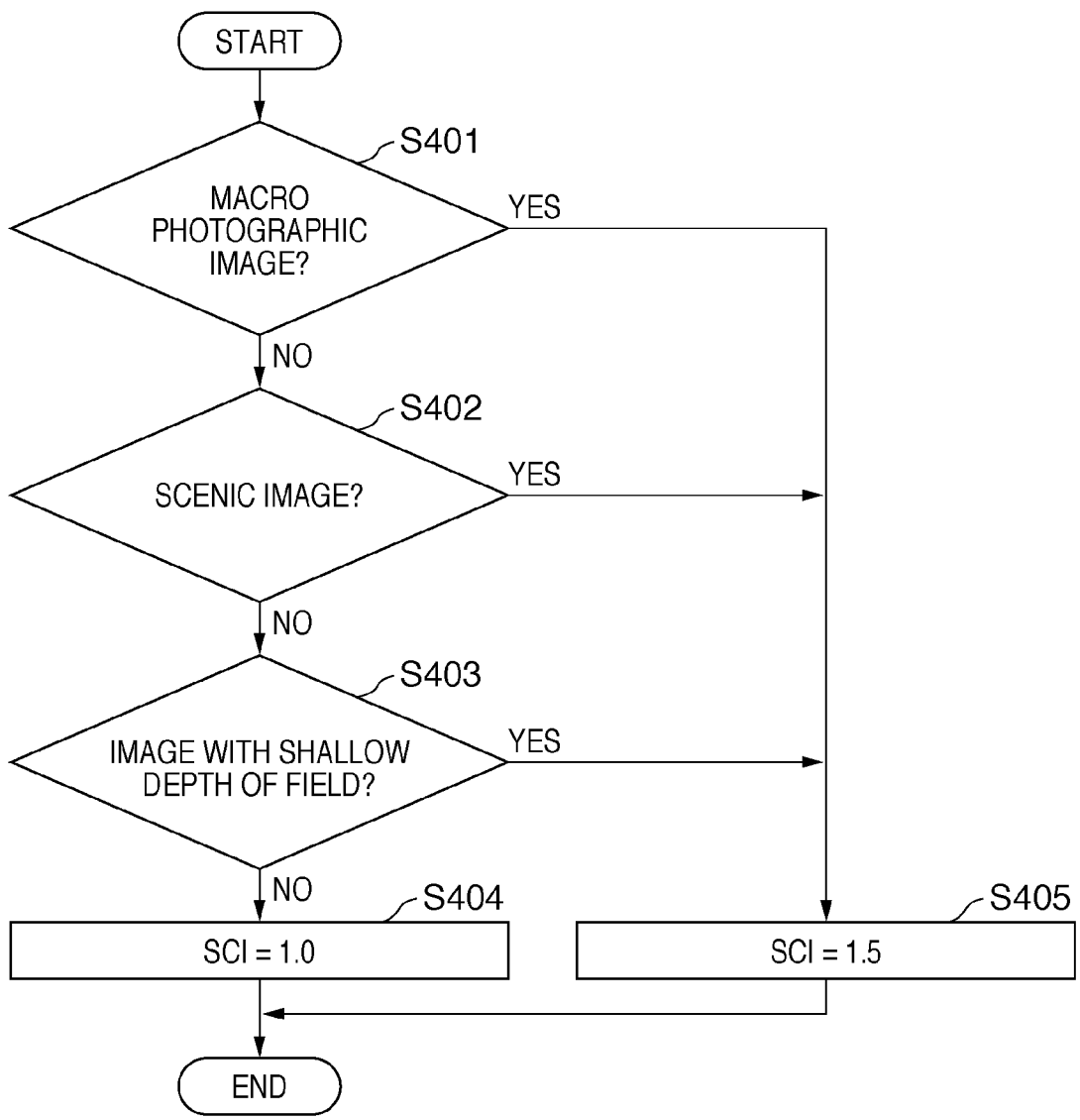
FIG. 6 is a flowchart for explaining determination of size control information (SCI)

FIG. 6 is a flowchart for explaining the determination (S207) of the size control information The CPU 104 checks the following condition (S401). If the following condition is met, the CPU 104 determines "macro photographic image" described above.

$$SDi \leq thSD \tag{1}$$

where SDi is the object distance of the IMGi, and thSD is a threshold.

In general, when the object distance SD is 50 cm or less, such photographing process is called macro photographing. Hence, the CPU 104 executes this checking process to have, for example, thSD=0.5 [m]. If the object distance range is acquired in place of the object distance SD, the CPU 104 determines "macro photographic image" described above when the value of the object distance range is "1".

If condition (1) is not met, the CPU 104 checks the following conditions (S402). If the two conditions are met, the CPU 104 determines "scenic image" described above.

$$Lfli \leq thLflw \tag{2}$$

$$Api \geq thApw \tag{3}$$

where Lfli is the lens focal length of the IMGi,
APi is the f-stop number of the IMGi, and
thLflw and thApw are thresholds.

If the object distance range and photographic scene type are acquired, the CPU 104 can determine "scenic image" above when the value of the object distance range is "3" (distant view) and the value of the photographic scene type is "1" (landscape mode). Note that the 35 mm equivalent lens focal length may be used in place of the lens focal length.

If conditions (2) and (3) are not met, the CPU 104 checks the following conditions (S403). If the two conditions are met, the CPU 104 determines "image with shallow depth of field" above.

$$Lfli > thLflt \tag{4}$$

$$Api < thApt \tag{5}$$

where thLflt and thApt are thresholds.

If the object distance range and photographic scene type are acquired, the CPU 104 can determine "image with shallow depth of field" above when the value of the object distance range is "2" (close-range view) and the value of the photographic scene type is "3" (portrait mode). Note that the 35 mm equivalent lens focal length may be used in place of the lens focal length.

If one of the three sets of conditions is met, the CPU 104 sets the size control information SCIi to be, for example, 1.5 (S405). If none of the three sets of conditions are met, the CPU 104 sets the size control information SCIi to be a default value "1" (S404). Note that the value of the size control information SCI may be changed depending on which of the three sets of conditions is met. For example, if condition (1) is met, SCI=1.3; if condition (2) and (3) are met, SCI=1.4; and if conditions (4) and (5) are met, SCI=1.2.

Since the macro photographic image 301 shown in FIG. 4 meets condition (1), and the image 303 photographed in a full aperture using the telephoto lens meets conditions (4) and (5), these images are laid out to have layout sizes larger than the standard size. On the other hand, since the image 302 photographed using the standard lens does not meet any of the conditions, it is laid out in the standard size.

As described above, the image sizes upon layout are determined based on additional information of the images to be laid out, and these images are laid out to fit in the frames. Therefore, an image photographed by the photographer with emphasis on an object by design can be laid out in a large size, and a layout which has good appearance and liveliness for album viewers can be realized.

Image processing of a second embodiment according to the present invention will be described below. Note that the same reference numerals in the second embodiment denote the same components as in the first embodiment, and a detailed description thereof will not be repeated.

The first embodiment has explained the example in which an image photographed by a photographer with emphasis on an object by design is extracted using additional information (photographic information) of the image, and an image size upon laying out that image is increased. In order to create an album with good appearance, an image size upon laying out an image whose image quality is improved by image correction or RAW image adjustment may be increased.

In the second embodiment, the CPU 104 acquires information (Exif metadata corresponding to a flag El to be described later) used to estimate whether or not image quality is improved in step S206 shown in FIG. 2. The layout size of an input image whose image quality is estimated to be improved is increased (for example, to set SCI=1.5).

Figure 7:
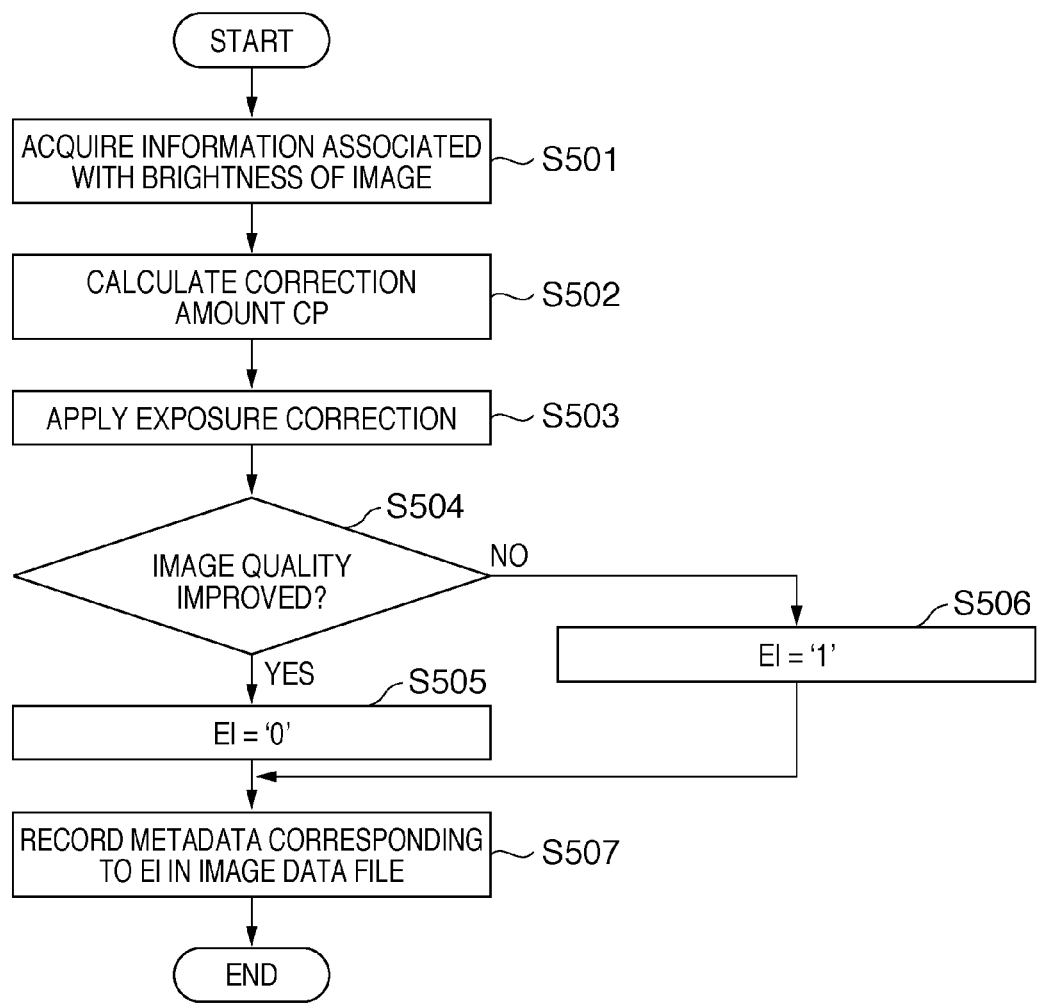
FIG. 7 is a flowchart showing an example of processing for improving the image quality of an IMGi (image correction processing)

FIG. 7 is a flowchart showing an example of processing for improving the image quality of an IMGi (image correction processing).

When the user designates image correction processing, the CPU 104 applies automatic correction processing to an IMGi. In this embodiment, exposure correction will be explained as an example of the automatic correction processing. As for exposure correction, many methods such as the inventions of Japanese Patent Laid-Open No. 9-068764, Japanese Patent Laid-Open No. 11-317873, and the like have been proposed. Therefore, the exposure correction itself adopts these techniques, and a detailed description thereof will not be given. The present invention is not limited to the exposure correction, but correction of saturation, hue, sharpness, or the like may also be applied.

The CPU 104 analyzes the IMGi to acquire information associated with the brightness of the IMGi (S501), and calculates a correction amount CPi based on the acquired information associated with the brightness (S502). The CPU 104 applies exposure correction to the IMGi based on the correction amount CPi (S503).

The CPU 104 checks the following condition (S504). If the following condition is met, the CPU 104 determines (estimates) that the image quality is to be improved by the exposure correction based on the correction amount CPi.

$$thCPmin \leq CPi \leq thCPmax \tag{6}$$

where thCPmin and thCPmax are thresholds.

The reason why the lower limit threshold thCPmin is set with respect to the correction amount CPi is to determine improvement of image quality that allows to recognize an effect of image correction. The reason why the upper limit threshold thCPmax is set is to avoid from setting a large layout size of an image whose image quality may deteriorate when the correction amount CPi is too large.

If it is determined that the image quality is to be improved, the CPU 104 sets a flag Eli indicating improvement of the image quality to be '0' (S505); otherwise, it sets the flag Eli to be '1' (S506). Then, the CPU 104 records Exif metadata corresponding to the flag Eli in a manufacturer note tag or the like of an image data file of the IMGi (S507).

The CPU 104 executes the aforementioned processing in accordance with a user's instruction. Alternatively, another image processing apparatus may apply the aforementioned processing to an image before it is input to the image processing apparatus of this embodiment, and may record the flag Eli in a manufacturer note tag.

In the above example, whether or not image quality is to be improved is determined using the correction amount. Alternatively, whether or not parameters used to demosaic RAW image data are adjusted (generated) may be used. Note that the RAW image data is image data (photographic data) in a state in which an electrical signal of a photographic image obtained by photoelectrically converting an object optical image by an image sensing device such as a CMOS sensor, CCD, or the like is converted into digital data. Processing for applying image processing such as color (pixel) interpolation, white balance adjustment, color correction, gamma correction, and the like to RAW image data to obtain an image which can be reproduced by a monitor or printer is called demosaicing processing. In general, a digital camera that can capture RAW image data internally determines parameters (to be referred to as developing parameters hereinafter) of the demosaicing processing, and records them together with image data. An apparatus which can reproduce RAW image data applies demosaicing processing to the RAW image data using the developing parameters to generate image data that can be reproduced by a monitor or printer.

In some image processing apparatuses, when a photographer or the like is dissatisfied with the developing parameters determined by the camera, he or she can adjust (or generate) the developing parameters. In this case, the adjusted (generated) developing parameters (to be referred to as custom developing parameters hereinafter) need to be saved in association with the RAW image data. The invention of Japanese Patent Laid-Open No. 2001-043118 discloses a method of adding the custom developing parameters after image data as metadata.

Figure 8:
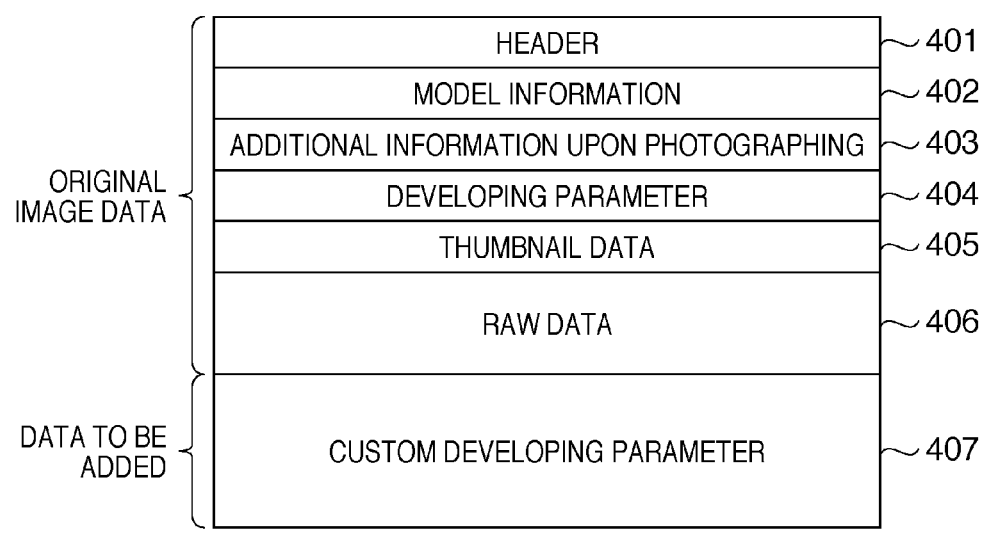
FIG. 8 is a view showing an example of the configuration of a RAW image data file.

FIG. 8 is a view showing an example of the configuration of a RAW image data file. Original image data includes a header 401, model information 402, additional information 403 upon photographing, developing parameters (determined by the camera) 404, thumbnail data 405, and RAW data 406. Custom developing parameters 407 are added after the original image data.

The CPU 104 checks in step S206 shown in FIG. 2 if the IMGi (in this case, RAW image data) is an image to be RAW-developed using custom developing parameters adjusted (generated) by design by a photographer or the like. That is, the CPU 104 checks if the custom developing parameters are added to the RAW image data file. If the custom developing parameters are added, the CPU 104 determines the image, the image quality of which is improved, and increases the layout size of the IMGi (e.g., to set SCIi=1.5). Note that the CPU 104 needs to apply demosaicing processing to the IMGi as RAW image data before step S209, but a detailed description of that processing will not be given.

As described above, the layout size is determined depending on an image whose image quality is estimated to be improved by image correction after photographing or an image whose developing parameters were adjusted (generated) by a photographer or the like, and that image is laid out to fit in the frame. Therefore, the image with improved image quality, can be laid out in a large frame, and a layout which has good appearance and liveliness for album viewers can be realized.

Note that the first and second embodiments have explained the methods of independently using additional information (photographic information), the presence/absence of image correction, and the presence/absence of custom developing parameters, for the sake of simplicity. However, the layout size may be determined by combining these three pieces of information.

Image processing of a third embodiment according to the present invention will be described below. Note that the same reference numerals in the third embodiment denote the same components as in the first and second embodiments, and a detailed description thereof will not be repeated.

The third embodiment will explain a method of determining the priority order upon laying out a plurality of images in accordance with additional information of images when images are to be laid out on a template including frames having different sizes. That is, an image with a higher priority order is assigned to a frame of a larger size.

Figure 9:
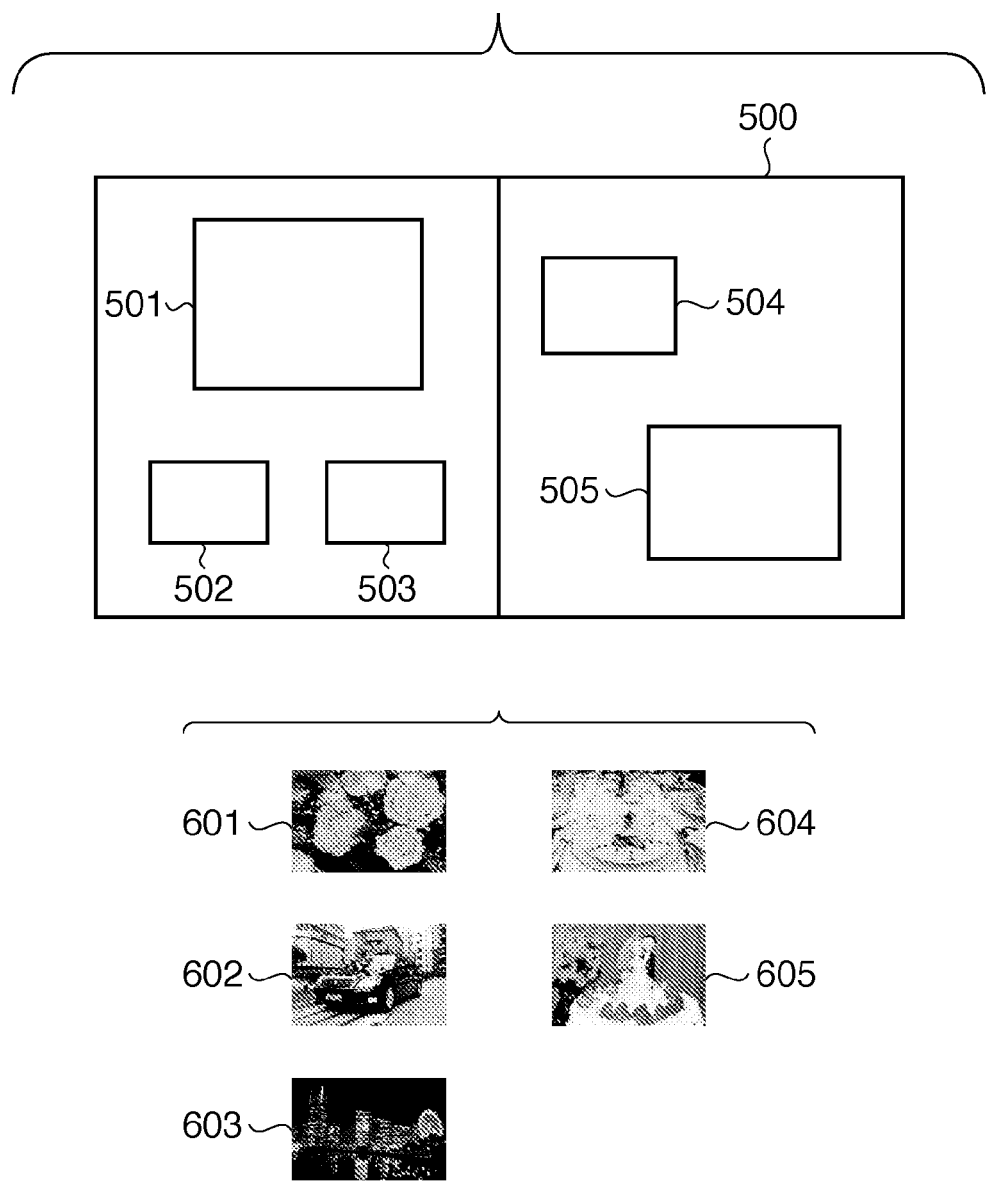
FIG. 9 is a view showing the relationship between a template and images.

FIG. 9 is a view for explaining the relationship between a template and images. Assume that a template 500 has five frames 501 to 505 having different sizes, and five input images 601 to 605 having the same size are to be laid out. Note that the image 601 is a macro photographic image, and the images 602 and 604 are images photographed using a standard lens. The image 603 is an image which was photographed using a wide-angle lens and underwent exposure correction. The image 605 is an image which was photographed in a full aperture using a telephoto lens, and underwent RAW developing processing using custom developing parameters, and exposure correction.

Former Stage of Layout Processing

Figure 10:
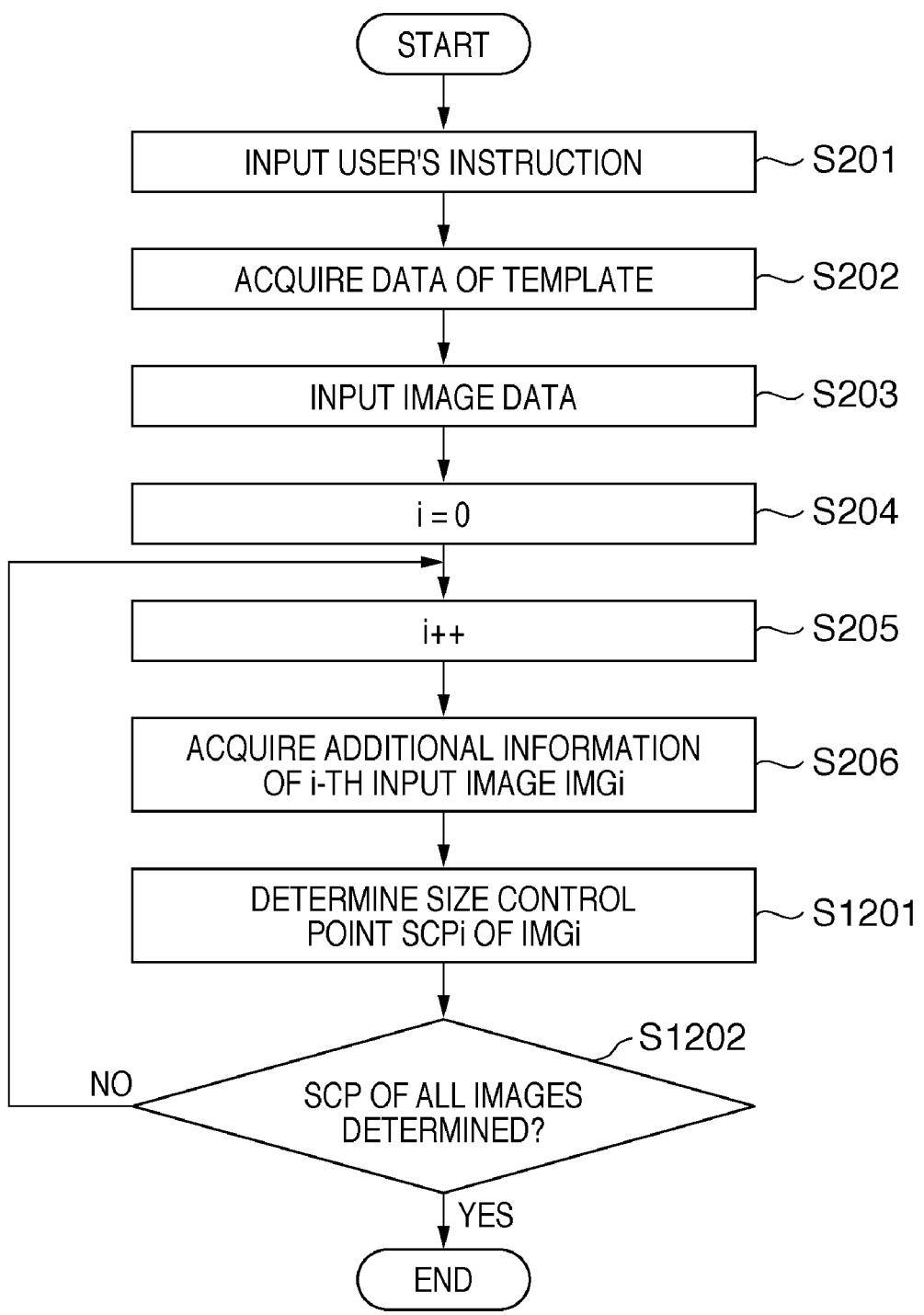
FIG. 10 is a flowchart for explaining a part (former stage) of layout processing according to the third embodiment.

FIG. 10 is a flowchart showing a part (former stage) of layout processing of the third embodiment. The CPU 104 executes this processing. Since the processes from step S201 to step S206 are the same as those in the first embodiment (FIG. 2), a detailed description thereof will not be repeated.

The CPU 104 sets a size control point SCPi of an IMGi (S1201). The size control point SCP indicates a degree to lay out an input image in a frame of a larger size, and an image whose layout size is to be larger has a larger value of the size control point SCP. The CPU 104 checks if the size control points SCP are set for all input images (or images for the number of frames of the template 500) (S1202). If this setting process is not complete yet, the process returns to step S205; otherwise, the process advances to the processing of a latter stage to be described later.

Setting of Size Control Point

Figure 11:
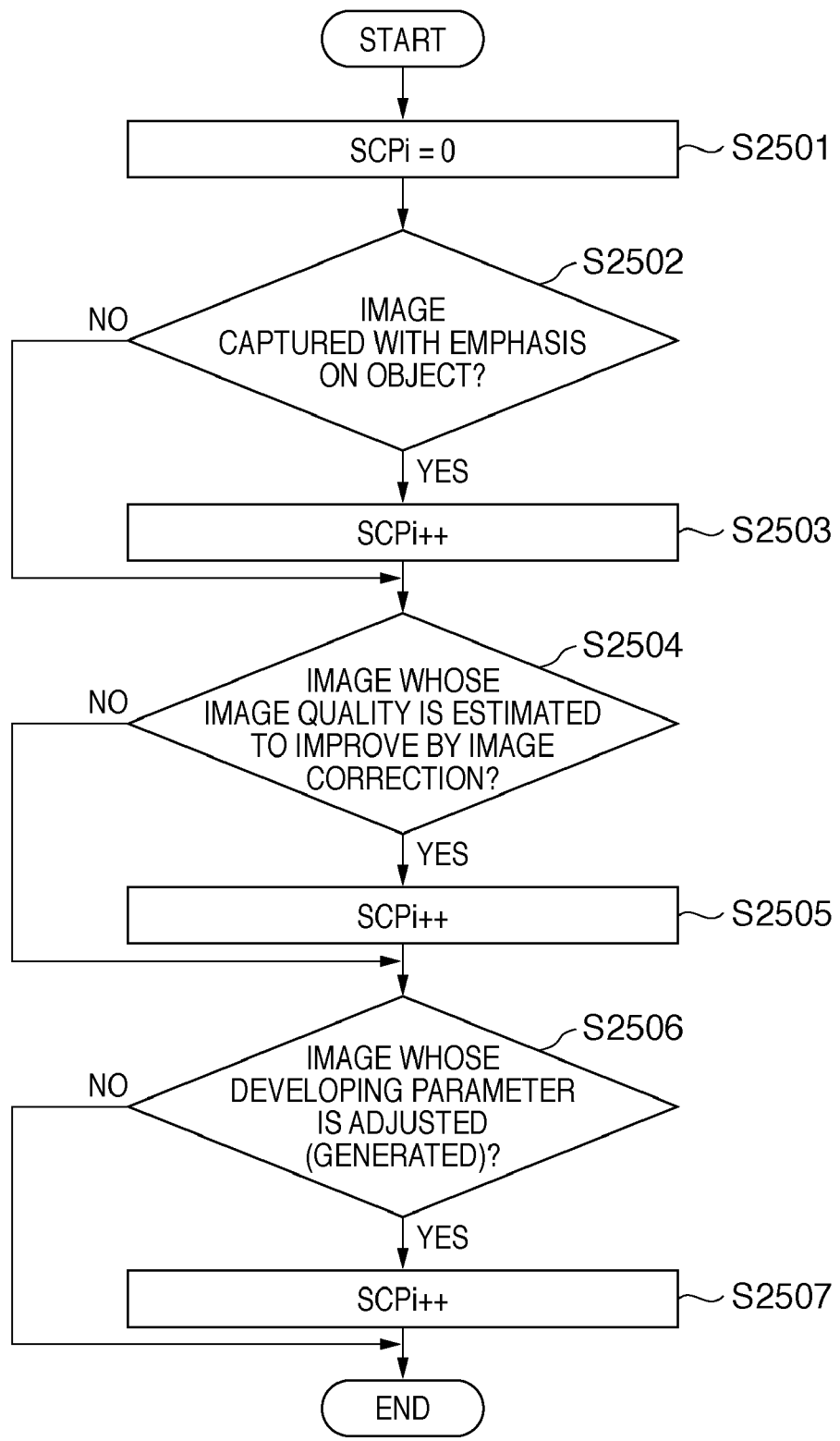
FIG. 11 is a flowchart for explaining processing for setting a size control point SCP.

FIG. 11 is a flowchart for explaining the processing for setting the size control point SCP.

The CPU 104 resets the size control point SCPi of the IMGi to zero (S2501), and checks if the IMGi is an image photographed by a photographer with emphasis on an object by design (S2502). This checking process can use the method described in the first embodiment (FIG. 6). If the IMGi is an image photographed by a photographer with emphasis on an object by design, the CPU 104 increments the size control point SCPi (S2503).

The CPU 104 checks if the IMGi is an image whose image quality is estimated to be improved by image correction after photographing (S2504). This checking process can use the method described in the second embodiment (FIG. 7). If the IMGi is an image whose image quality is estimated to be improved by image correction after photographing, the CPU 104 increments the size control point SCPi (S2505).

The CPU 104 checks if the IMGi is an image for which a photographer or the like adjusted (generated) developing parameters (S2506). This checking process can use the method described in the second embodiment. If the IMGi is an image for which a photographer or the like adjusted (generated) developing parameters, the CPU 104 increments the size control point SCPi (S2507).

Figure 12:
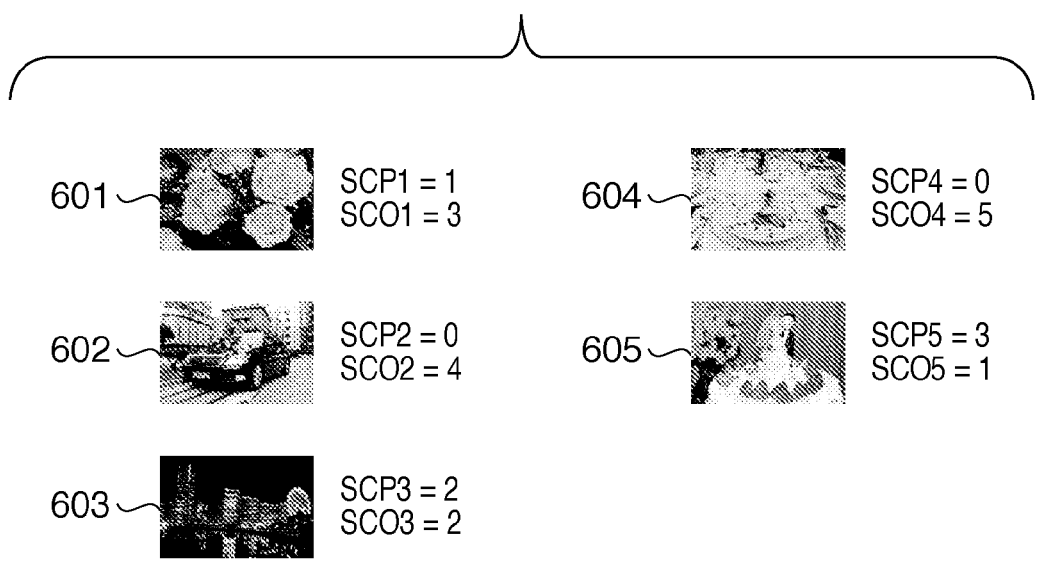
FIG. 12 is a view showing the setting results of the size control points SCP for the input images shown in FIG. 9.

FIG. 12 is a view showing the setting results of the size control points SCP for the input images 601 to 605 shown in FIG. 9. The following size control points SCP are respectively set for the input images.

Input image 601 (IMG1): SCP1=1 (∵a macro photographic image)
Input image 602 (IMG2): SCP2=0
Input image 603 (IMG3): SCP3=2 (∵a scenic image+improved image quality)
Input image 604 (IMG4): SCP4=0
Input image 605 (IMG5): SCP5=3 (∵an image with a shallow depth of field+improved image quality+demosaicing processing using custom developing parameters)

Latter Stage of Layout Processing

Figure 13:
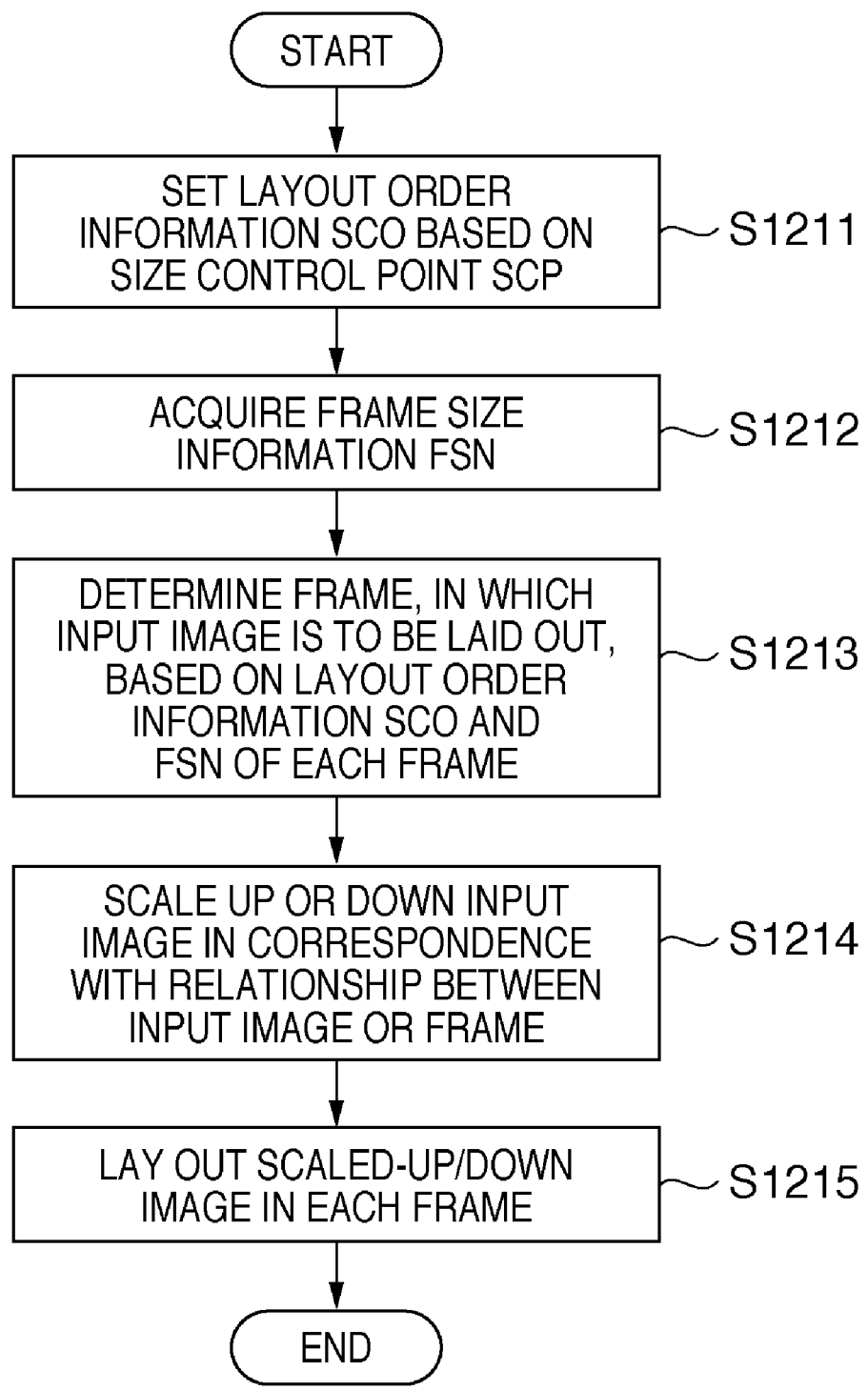
FIG. 13 is a flowchart showing a part (latter stage) of the layout processing according to the third embodiment.

FIG. 13 is a flowchart showing a part (latter stage) of the layout processing of the third embodiment.

The CPU 104 sets layout order information SCO required to sort the input images in descending order of size control point SCP (S1211). When the images have the same value of the size control point SCP, the CPU 104 sorts the images in their input order (or ascending order of file name, that of photographing date and time, or the like). That is, the input images 601 to 605 have the following layout order information SCO.

Input image 601 (IMG1): SCO1=3 (SCP1=1)
Input image 602 (IMG2): SCO2=4 (SCP2=0)
Input image 603 (IMG3): SCO3=2 (SCP3=2)
Input image 604 (IMG4): SCO4=5 (SCP4=0)
Input image 605 (IMG5): SCO5=1 (SCP5=3)

The CPU 104 acquires size information of frames included in the template (S1212). Template data records data indicating the relationship between the frames and frame size numbers FSN indicating their size order. The CPU 104 acquires the data indicating this relationship from the template data. Assume that the relationship between the frames 501 to 505 of the template 500 shown in FIG. 9 and the FSNs is as follows.

Frame 501: FSN1=1
Frame 502: FSN2=4
Frame 503: FSN3=5
Frame 504: FSN4=3
Frame 505: FSN5=2

As for the FSNs of the frames having the same size, it is desired to set a smaller number for a frame at a position where an album viewer is easier to notice. For example, when a bound album has a left binding position, a viewer tends to notice images on the left side first upon turning pages of the album. In this case, smaller numbers are assigned to frames located on the left side. In the example of FIG. 9, the frames 502 and 503 have the same size, and a smaller number is assigned to the frame 502 located on the left side.

The CPU 104 determines frames in which the input images are to be laid out, based on the layout order information SCO and the FSN values of the respective frames (S1213). That is, the CPU 104 assigns the input images to the frames in descending order of SCO and in descending order of FSN, so as to assign input images whose layout sizes are to be increased to frames with larger sizes. The CPU 104 assigns the input image with SCO=1 to the frame with FSN=1, the input image with SCO=2 to the frame with FSN=2, and so forth. As a result, the assignment relationship between the input images and frames is as follows.

Input image 601 (SCO1=3)→frame 504 (FSN4=3)
Input image 602 (SCO2=4)→frame 502 (FSN2=4)
Input image 603 (SCO3=2)→frame 505 (FSN5=2)
Input image 604 (SCO4=5)→frame 503 (FSN3=5)
Input image 605 (SCO5=1)→frame 501 (FSN1=1)

The CPU 104 scales up or down the input images in correspondence with the determined assignment relationship between the input images and frames (S1214), and lays out the scaled-up/down input images in the frames (S1215). Note that each image is scaled up or down while maintaining the proportions of the input image. Therefore, the image does not lie off the frame size.

Figures 14, 15:
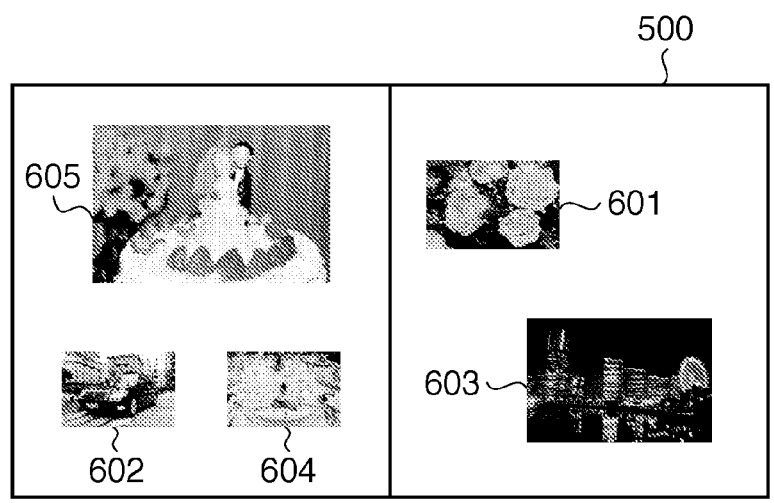
FIG. 14 is a view showing a layout state of input images.
FIG. 15 is a view showing an example of weights for photographic information.

FIG. 14 is a view showing the input images 601 to 605 laid out by the aforementioned processing.

The aforementioned processing is for one page or two-page spread of an album. When input images to be processed still remain even after the aforementioned processing, the CPU 104 returns to the processing in FIG. 10 to similarly process the remaining input images.

In the above description, the size control points SCP are not weighted in association with the photographic information, image correction, and demosaicing processing using custom developing parameters. However, the size control points SCP may be weighted in association with these pieces of information. FIG. 15 shows an example of weights for photographic information.

The three pieces of information, that is, the photographic information, image correction, and demosaicing processing using custom developing parameters need not be referred to upon setting the size control points SCP. One or two out of these pieces of information may be used.

As described above, the layout order of input images is set based on the photographic information, image correction, and demosaicing processing using custom developing parameters of the input images. Then, the layout of the input images is determined with reference to information indicating the size order of the frames of the template. Therefore, when a template on which various frames from small to large are arranged is used, an image photographed with emphasis on an object by design, an image whose image quality is estimated to be improved by image correction after photographing, and an image whose developing parameters were adjusted (generated) can be preferentially laid out in larger frames.

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-341118, filed Dec. 28, 2007, which is hereby incorporated by reference herein in its entirety.

What is claimed is:

1. An image processing apparatus comprising:
an input unit configured to input a plurality of input images;
an acquisition unit configured to acquire photographic information added to each of the plurality of input images;
a first setting unit configured to set control information used to control a layout of each of the plurality of input images in accordance with whether or not the photographic information indicates that the respective input image is photographed with emphasis on an object; and
a generator configured to generate an output image on which each of the plurality of input images is configured to have an image size according to the control information of the respective input image.

2. The apparatus according to claim 1, wherein the generator generates the output image on which the plurality of input images are arranged in accordance with a template indicating a layout of the plurality of input images.

3. The apparatus according to claim 2, wherein the first setting unit comprises:
a determiner configured to determine whether or not the photographic information indicates that the respective input image is photographed with emphasis on the object; and
a second setting unit configured to set, as the control information, a magnification used to scale up the size of the respective input image for a frame which is arranged on the template and indicates an image layout position, when it is determined that the photographic information indicates that the respective input image is photographed with emphasis on the object.

4. The apparatus according to claim 3, wherein each of the plurality of input images that is photographed with emphasis on the object is selected from the group consisting of:
a close-up picture of the object;
a picture photographed by adjusting a focus on the object as a whole using a wide-angle lens; and
a picture photographed by capturing an image of the object in a full aperture using a telephoto lens in which the picture has a shallow depth of field.

5. The apparatus according to claim 2, wherein the generator determines frames in which the plurality of input images are respectively arranged in accordance with the control information and information indicating sizes of frames which are arranged on the template and indicate image layout positions.

6. An image processing apparatus comprising:
an input unit configured to input a plurality of images;
an acquisition unit configured to acquire additional information added to each of the plurality of images;
a first setting unit configured to set control information used to control layout of the plurality of images in accordance with the additional information; and
a generator configured to generate an output image on which each of the plurality of images is configured to have an image size according to the control information of the respective image,
wherein the generator generates the output image on which the plurality of input images are arranged in accordance with a template indicating a layout of a plurality of images,
wherein the generator determines frames in which the plurality of images are respectively arranged in accordance with the control information and information indicating sizes of frames which are arranged on the template and indicate image layout positions,
wherein the first setting unit further comprises:
a first determiner configured to determine, based on the additional information, whether the image is a picture photographed with emphasis on an object;
a second determiner configured to determine whether the image is a picture whose image quality is estimated to be improved by image correction;
a third determiner configured to determine whether the image is a picture on which demosaicing processing using custom developing parameters was performed; and
a second setting unit, configured to set, as the control information, a point indicating a degree to lay out the image in a frame with a large size in accordance with determination results of the first to third determiners.

7. A method of controlling an image processing apparatus, the method comprising:
inputting a plurality of input images;
acquiring photographic information added to each of the plurality of input images;
setting control information used to control a layout of each of the plurality of input images in accordance with whether or not the photographic information indicates that the respective input image is photographed with emphasis on an object; and
generating an output image on which each of the plurality of input images is configured to have an image size according to the control information of the respective input image.

8. A non-transitory computer-readable medium storing a computer-executable program for causing a computer to perform a method of controlling an image processing apparatus, the method comprising:
inputting a plurality of input images;
acquiring photographic information added to each of the plurality of input images;
setting control information used to control a layout of each of the plurality of input images in accordance with whether or not the photographic information indicates that the respective input image is photographed with emphasis on an object; and generating an output image on which each of the plurality of input images is configured to have an image size according to the control information of the respective input image.

* * * * *